(12) United States Patent
Talley

(10) Patent No.: US 6,513,047 B1
(45) Date of Patent: Jan. 28, 2003

(54) MANAGEMENT OF USER-DEFINABLE DATABASES

(75) Inventor: Stephen C. Talley, Colorado Springs, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 717 days.

(21) Appl. No.: 08/923,717

(22) Filed: Sep. 4, 1997

(51) Int. Cl.[7] ............................................. G06F 17/00
(52) U.S. Cl. ...................................... 707/200; 707/104.1
(58) Field of Search ............................... 707/200, 100, 707/104.1; 395/604, 527

(56) References Cited

U.S. PATENT DOCUMENTS

| | | | | |
|---|---|---|---|---|
| 4,924,515 A | * | 5/1990 | Matyas et al. | 380/25 |
| 4,961,139 A | * | 10/1990 | Hong et al. | 364/200 |
| 5,367,635 A | * | 11/1994 | Bauer et al. | 395/600 |
| 5,426,421 A | * | 6/1995 | Gray | 340/825.15 |
| 5,511,191 A | * | 4/1996 | De Leeuw Van Weenen et al. | 395/600 |
| 5,657,460 A | * | 8/1997 | Egan et al. | 395/326 |
| 5,710,918 A | * | 1/1998 | Lagarde et al. | 707/10 |
| 5,715,453 A | * | 2/1998 | Stewart | 707/104 |
| 5,740,423 A | * | 4/1998 | Logan et al. | 395/610 |
| 5,752,247 A | * | 5/1998 | Henderson | 707/102 |
| 5,758,150 A | * | 5/1998 | Bell et al. | 395/610 |
| 5,799,310 A | * | 8/1998 | Anderson et al. | 707/102 |
| 5,881,232 A | * | 3/1999 | Cheng et al. | 395/200.47 |
| 5,950,190 A | * | 9/1999 | Yeager et al. | 707/3 |

* cited by examiner

*Primary Examiner*—Safet Metjahic
*Assistant Examiner*—Uyen Le
(74) *Attorney, Agent, or Firm*—William J. Kubida; Stuart T. Langley; Hogan & Hartson LLP (57) ABSTRACT

A method and computer program product for managing and manipulating user-defined and system databases in a computing system. A database interface, which can be a graphical user interface, accesses a database configuration file containing descriptions of the contents of each of the databases. The database interface interprets the contents of each database in accordance with the configuration file, and provides for user access and manipulation of the contents of the databases.

16 Claims, 9 Drawing Sheets

18 — DATABASE CONFIGURATION FILE:

- DATABASE FILE NAME — 40
- FIELD DELIMITER — 42
- COMMENT DELIMITER — 44
- DATA FIELD 1 ⎫
  ⋮          ⎬ 46
  DATA FIELD N ⎭

*Fig. 3*

40A — "/etc/passwd" \
42A — : \
44A — " " \
46A {
Username=`/home/talley/.mapmanager.scripts/getParams Username`\
Password \
UID \
GID \
Comment \
HomeDdir=`/home/talley/.mapmanager.scripts/getParams HomeDir`\
Shell={/bin/csh/bin/sh/bin/ksh}
}

/etc/shadow \
: \
" " \
Username=`/home/talley/.mapmanager.scripts/getParams Username`\
Password \
"Last Changed" \
"Warn Period" \
"Inactive Period" \
"Expires" \

40B — /etc/hosts \
42B — " " \
44B — # \
46B {
"IP Address" \
Hostname \
Alias
}

/etc/ethers \
" " \
\
"Ethernet Address" \
"Hostname"

/etc/vfstab \
" " \
\
"Device to Mount" \
"Device to fsck" \
"Mount point" \
"FS Type"={fd proc swap ufs nfs tmpfs} \
"fsck Pass"={yes no} \
"Mount at Boot?" \
"Mount Options"

/etc/services \
" " \
"Service Name" \
"Port/Protocol" \
Aliases

56A ⟶  ⌐52A    ⌐56A root:x:0:1:Super-User:/:/bin/zsh
daemon:x:1:1::/:
bin:2:2::/usr/bin:
sys:x:3:3::/:
adm:x:4:4:Admin:/var/adm:
lp:x:71:8:Line Printer Admin:/usr/spool/lp:
stmp:x:0:0:Mail Daemon User:/:
uucp:x:5:5:uucp Admin:/usr/lib/uucp:
nuucp:x:9:9:uucp Admin:/var/spool/uucppublic:/usr/lib/uucp/uucico
listen:x:37:4::Network Admin:usr/net/nls:
nobody:x:60001:60001:Nobody:/:
noaccess:x:60002:60002:No access User:/:
nobody4:x:65534:65534:sunOS .x Nobody:/:
Ptalley:x:101:1Ptalley PPP account:/:/usr/sbin/aspppls
sybase:x:1001:10:user to run java database:/home/sybase:/bin/zsh
fred:x:65535:1::/home/fred:/home/talley/bin/zsh
randyc:x:28227:10::/:/bin/csh

```
!/bin/sh test "$1" = "Username" && \
    ypcat passwd | cut -f1 -d: | sort test "$1" = "HomeDir" && \
    /bin/ls -ld /home/* test "$1" = "Device to Mount" && \
    /bin/ls -l /dev/dsk/* test "$1" = "Device to Mount" && \
    /bin/ls -l /dev/rdsk/* test "$1" = "Mount point" && \
    mount | cut -fd -d" "

exit 0
```

| Username | Password | UID | GID | Comment | HomeDir |
|---|---|---|---|---|---|
| root | x | 0 | 1 | Super-User | / |
| daemon | x | 1 | 1 | | / |
| bin | x | 2 | 2 | | /usr/bin |
| sys | x | 3 | 3 | | / |
| adm | x | 4 | 4 | Admin | /var/adm |
| lp | x | 71 | 8 | Line Printer Admin | /usr/spool/lp |
| smtp | x | 0 | 0 | Mail Daemon User | / |
| uucp | x | 5 | 5 | uucp Admin | /usr/lib/uucp |
| nuucp | x | 9 | 9 | uucp Admin | /var/spool/uucppublic |
| listen | x | 37 | 4 | Network Admin | /usr/net/nls |
| nobody | x | 60001 | 60001 | Nobody | / |
| noaccess | x | 60002 | 60002 | No Access User | / |
| nobody4 | x | 65534 | 65534 | SunOS 4.x Nobody | / |
| Ptalley | x | 101 | 1 | Ptalley PPP account | / |

Current Map: /etc/passwd

MANAGEMENT OF USER-DEFINABLE DATABASES

BACKGROUND OF THE INVENTION

1. Field of the Invention

This invention relates in general to management of computer databases, and more specifically to management of user-definable databases of computer systems and networks.

2. Description of the Background

Administration of computer systems and networks can be a complex task involving the management of numerous user accounts (including user names, user passwords, user privileges, etc.), various system devices (device names, device addresses, etc.), and other features and characteristics of the computing system. Various software tools have been developed to simplify the management of a computing system/network by assisting a system administrator with the management of the computing system/network. Examples of conventional network management/administration software tools include Sun Microsystems AdminSuite and Admin-Tool which can be used, for example, in conjunction with Sun Microsystems Solaris operating system. The network management software permits a network administrator to monitor and manage user accounts, passwords, machine or network IP addresses, host names, devices, etc.

Conventionally, the network management software are provided with databases containing information on the computing systems/network configuration and characteristics. These databases are standard databases for a particular computing system or are specific databases for the particular network management software. Conventionally, these databases are "hard coded" as predefined databases recognized by the network management software. In this sense, the network management software is adapted only to recognize and manage the specific and predefined set of system or network databases. Conventional network management software does not permit access, use, or interaction with databases which have not been predefined or hard coded into the network management software. For instance, if a system administrator created a specialized database, conventional network management software could not be used for accessing and manipulating the specialized database.

What is needed is a network management tool which can recognize, interact, and manipulate a user-defined database as well as conventional hard coded databases.

SUMMARY OF THE INVENTION

In accordance with this invention, the above problems have been solved by a system, method, and computer program product for managing and manipulating user-defined and system databases in a computing system. A database interface, which can be a graphical user interface, accesses a database configuration file containing descriptions of the contents of each of the databases. The database interface interprets the contents of each database in accordance with the configuration file, and provides for user access and manipulation of the contents of the databases.

According to one broad aspect of the present invention, a method for managing a plurality of computer databases is presented. A database configuration file containing information regarding each of the plurality of computer databases is provided. An interface to the plurality of computer databases is provided for permitting manipulation of the plurality of computer databases by a user. The interface accessing the database configuration file for information relating to the content and format of each database. A manipulation step manipulates one of the computer databases in accordance with a command from the user.

The above steps in another implementation of the invention are provided as an article of manufacture, i.e., a computer storage medium containing a computer program of instructions for performing the above-described steps.

The great utility of the present invention is that various different user-defined databases can be accessed and manipulated by a network management software program.

The foregoing and other features, utilities and advantages of the invention will be apparent from the following more particular description of a preferred embodiment of the invention as illustrated in the accompanying drawings.

DETAILED DESCRIPTION OF PREFERRED EMBODIMENTS

Figure 1:
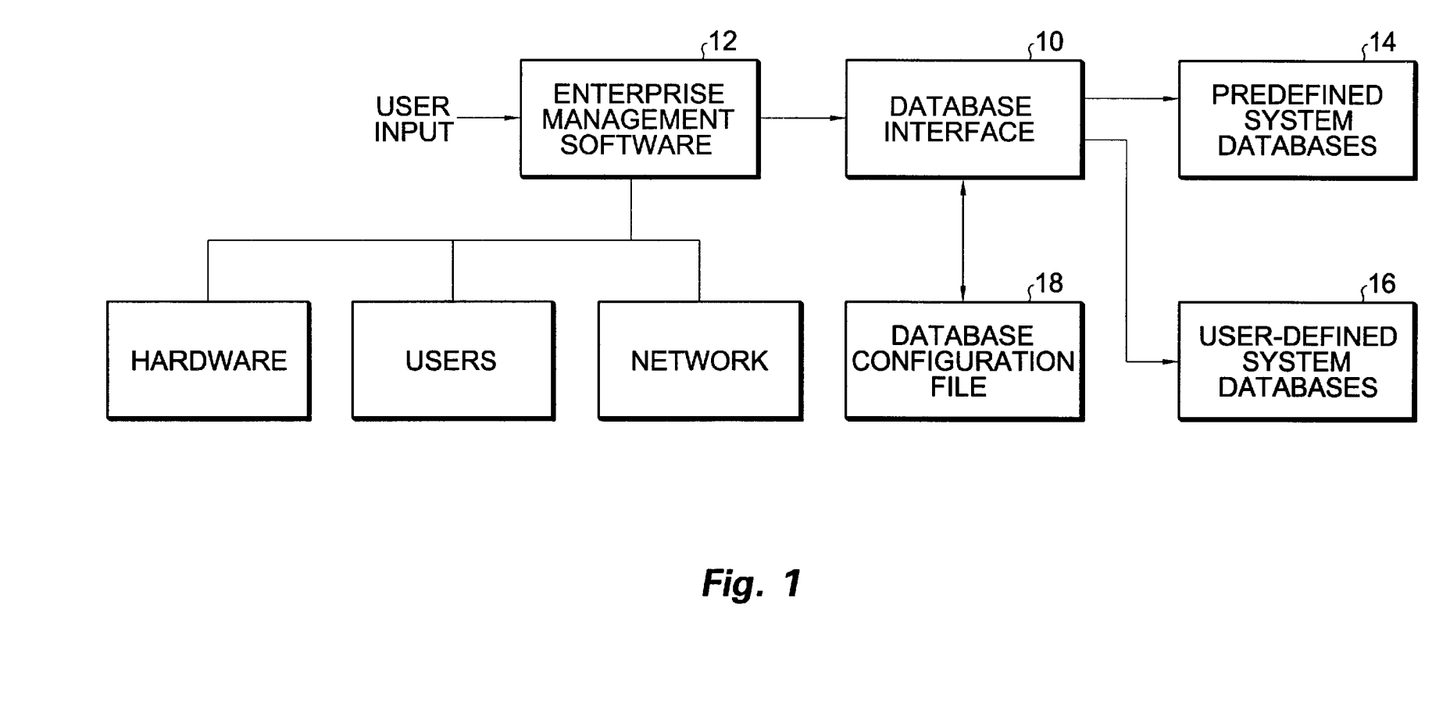
FIG. 1 illustrates a block diagram of the present invention for performing the operations of the present invention.

FIG. 1 is a block diagram of one embodiment of the present invention. In accordance with the present invention, a database interface 10 is provided to permit interaction, access, and manipulation by user input into an enterprise or network management software tool 12 of both predefined system databases 14 and user defined system databases 16. In this manner, a user, such as a system administration, can create or define customized databases and manage these databases with the network management software 12. Enterprise or network management software 12 manages information about users, hardware, or the network, or the like, in the computing system. As used herein, the term "database" is synonymous with "map" which refers to a file containing data relating to the computing system or otherwise. In one embodiment of the invention, the database is a non-binary ASCII text file accessible by the database interface 10 (FIG. 1). By using a simple ASCII text file as a database file, there is no need to run an additional program to decode and read the contents of the database.

Database interface 10 is capable of manipulating multiple databases having different database formats. In accordance with the present invention, a database configuration file 18 contains information about the format and content of each database accessed by database interface 10, as will be described in greater detail. Database interface 10 and database configuration file 18 can be separate modules as shown in FIG. 1, or could be incorporated within network management software 12 depending upon the particular implementation chosen.

Network management software 12 can be implemented as a graphical user interface (GUI) which provides a simple and understandable interface to the user for managing the network and the content of databases 14 and 16.

While databases 14 and 16 are shown in block diagram form, it is understood that databases 14 and 16 each represent possibly multiple and varied databases which contain information regarding the computing system or otherwise.

Figure 2:
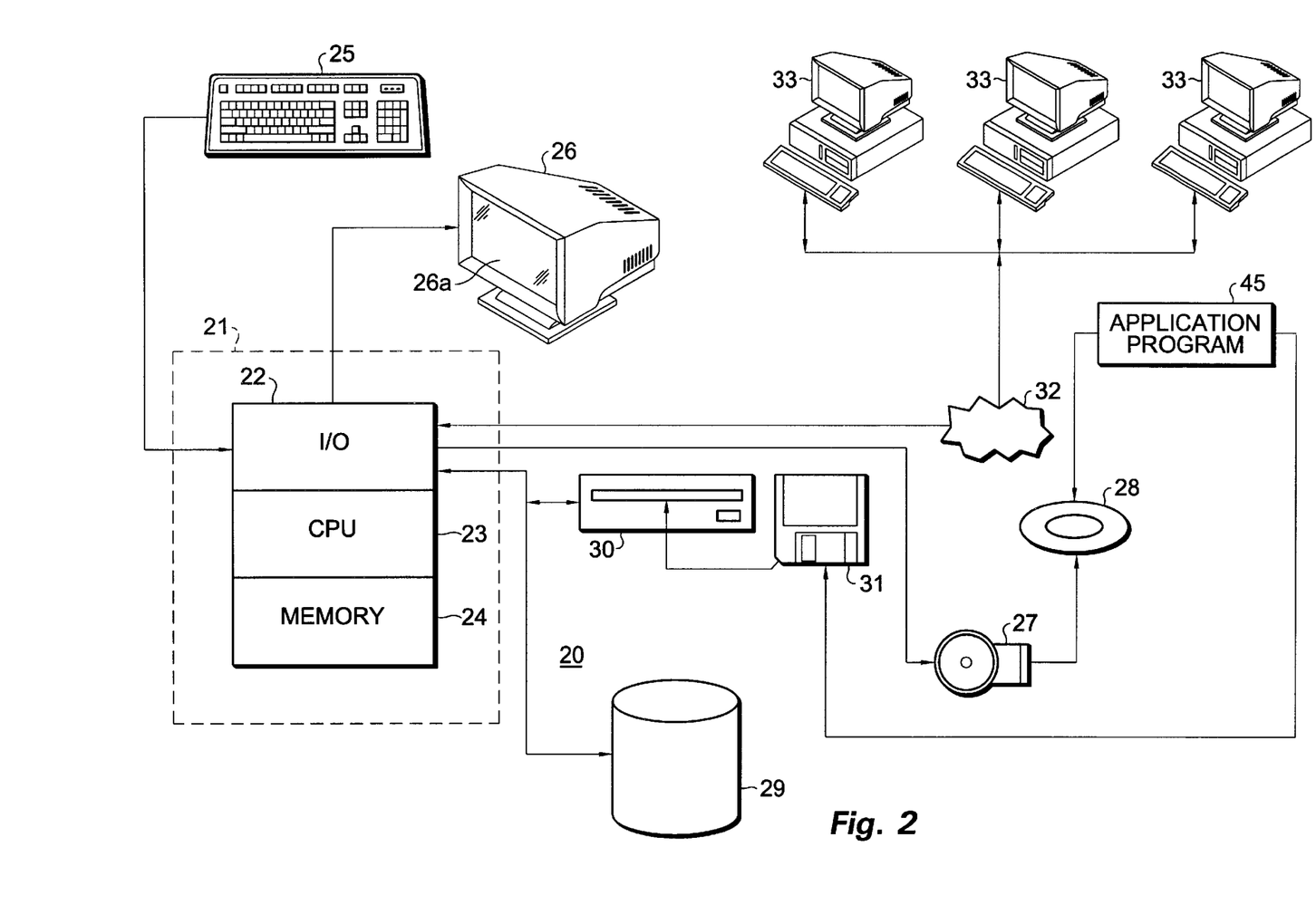
FIG. 2 illustrates a block diagram of a computer system, which may be part of a network computer system, showing one environment in which the present invention may be employed.

The operating environment in which the present invention is used encompasses a standalone computing system as well as a general distributed computing system. In the distributed computing system, general purpose computers, workstations, or personal computers are connected via communication links of various types in a client-server arrangement. Programs and data, many in the form of objects, are made available by various members of the system. Some of the elements of a standalone computer or a general purpose workstation are shown in FIG. 2, wherein a processor 21 is shown, having an input/output (I/O) section 22, a central processing unit (CPU) 23 and a memory section 24. The I/O section 22 is connected to a keyboard 25, a display unit 26, a disk storage unit 29, 30 and 31, a CD-ROM drive unit 27, and a network 32. The CD-ROM unit 27 can read a CD-ROM medium 28 which typically contains programs 35 and data. The computer program products containing mechanisms to effectuate the apparatus and methods of the present invention may reside in the memory section 24, on the disk storage unit 29 or 31, or on the CD-ROM 28 of such a system. Examples of such systems include SPARC Systems offered by Sun Microsystems, Inc., personal computers offered by IBM Corporation and by other manufacturers of IBM compatible personal computers, and systems running the UNIX operating system or Solaris™ operating system.

Remote computing stations 33 are interconnected over network 32 for sharing data and network resources. Each of the remote computing stations 33 could include similar elements as shown in FIG. 2 and described above. It is understood that the present invention could be operated on any of the computing stations 33.

Preferably the invention can be embodied in a computer program product. It will be understood that the computer program product of the present invention preferably is created in a computer usable medium, having computer readable code embodied therein. The computer usable medium preferably contains a number of computer readable program code devices configured to cause a computer to affect the various functions required to carry out the invention, as herein described.

The embodiments of the invention described herein are implemented as logical operations in a computing system. The logical operations of the present invention are implemented (1) as a sequence of computing implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps, or modules.

As shown in FIG. 2, the present invention could be embodied within in application program 35 operating within the computing system 20. The application program 35 could be accessed over network 32 by remote stations 33, or accessed locally by the CPU 23. The predefined system databases 14 and the user defined system databases 16 (shown in FIG. 1) could be stored within disc storage unit 29, the floppy disc 31, or the CD-rom medium 28. Alternatively, the databases 14, 16 could be stored remotely within the storage devices associated with remote computers 33. The location of the network management software, database interface, database configuration file, and associated databases is a matter of choice dependent upon the particular implementation chosen, and does not limit the scope of the present invention.

Figure 3:
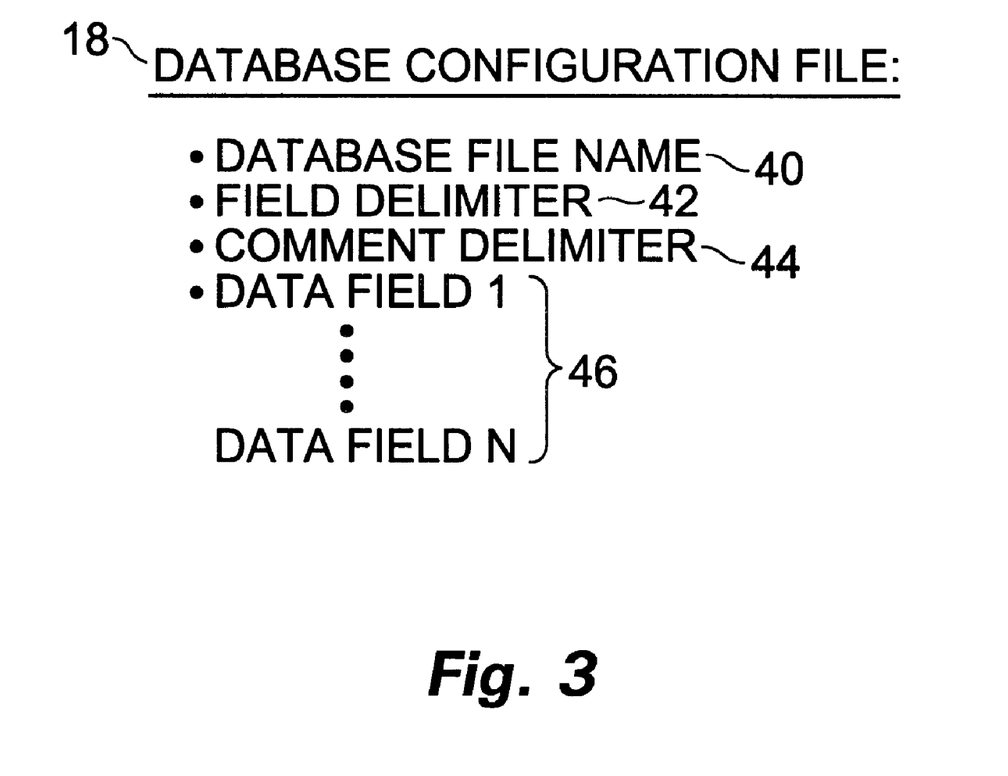
FIG. 3 illustrates the contents of an exemplary database configuration file of the present invention.

FIG. 3 illustrates one embodiment of the database configuration file 18. As previously mentioned, the database configuration file contains entries which describe the characteristics and contents of a particular database. The database configuration file 18 will have an entry corresponding to each database which is to be managed by the network management software. Hence, both the predefined system databases and the user defined system databases will have corresponding entries within the database configuration file. As new user defined databases are created, a corresponding entry in the database configuration file is added.

Referring to FIG. 3, the elements describing a single database are shown. The elements shown in FIG. 3 corresponds to each entry within a particular database. Depending upon the particular database, numerous data field entries may be contained within the database, as FIG. 3 illustrates data fields 1 through data field N.

The database file name 40 contains the name of the database referenced by the subsequent elements. The comment delimiter 44 contains the character or manner in which comments (i.e., comment statements or remark statements which are not part of the valid data of the database) are indicated within the database. For instance, if the comment delimiter is a pound sign "#", then the text following the comment delimiter is ignored by the database interface when accessing the database.

Field delimiter 42 indicates the manner in which fields within the database are separated (i.e., where one field ends and the next field starts). In one example, a field delimiter is a colon placed between fields.

Data fields 46 contain one or more field headings for the various data fields within the particular database. Within the database, these fields are separated by the field delimiter specified by field delimiter 42. The field headings corresponding to data fields 46 are used by the present invention as titles or headings of the data contained within the particular field. For instance, a field heading 46 of "user name" corresponding to the first data field in the database means that each first data entry within the database will be treated and labeled as a user name.

Fields 46 can optionally each be provided with default values specified within the configuration file. These default values are used by the database interface to provide default settings which appear in the graphical user interface of the network management software tool. In accordance with the present invention, the type of default values can be a single static or atomic default value, a list of static default values, or a dynamic list of default values.

These different types of default values can be distinguished by using different delimiters within the configuration file. For instance, a set of curly braces (left curly brace, right curly brace) can be used to contain a static list of defaults, while single quotation marks can be used to contain a command line to execute a file which dynamically generates a list of default values.

Using the database configuration file 18 shown in FIG. 3, the present invention can therefore properly access and manipulate the contents of the particular database, even if the various databases within the computing system have different formats and varying types of data.

Figure 4:
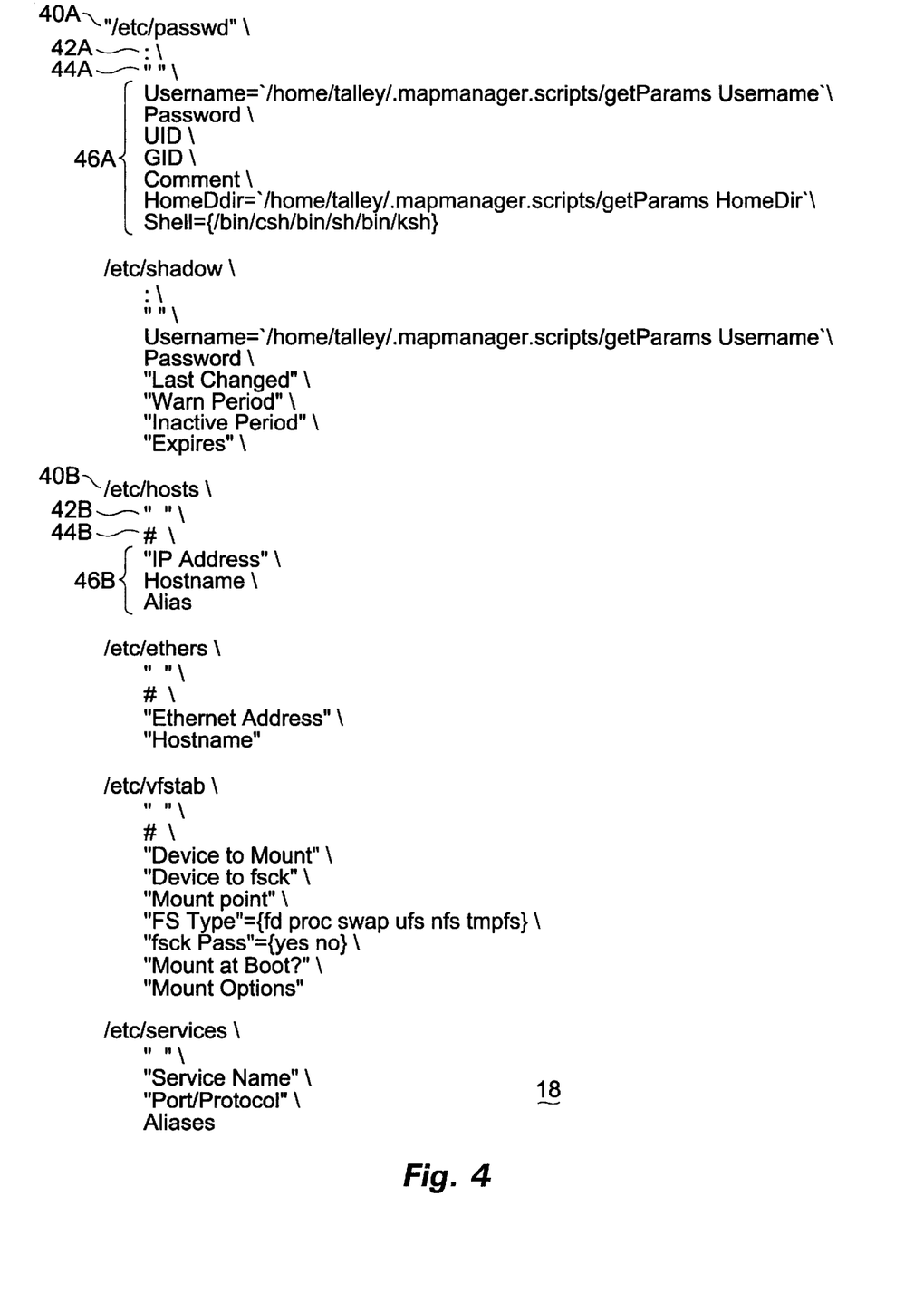
FIG. 4 illustrates an example of a configuration file in accordance with the present invention.

FIG. 4 illustrates an example of a configuration file in accordance with the present invention. The example of FIG. 4 shows configuration file information for six different database files. Database file name 40A "/etc/passwd" references a password file in the "ETC subdirectory" which contains user names, passwords, user and group identifications, comments, home directories, and a shell for each user referenced in the database. The field delimiter 42A specified within the configuration file for this database is a colon, while the comment delimiter 44A is a null character.

There are seven fields 46A shown associated with the password database. As previously discussed, these fields can include defaults of either a single fixed default, a static list of defaults, or a dynamic list of defaults. The user name field shown in 46A is a command line to be executed to obtain a dynamic list of defaults. In particular, the user name field obtains user names by calling a "getparams" file. The "homedir" also provides a dynamic list of defaults by using the getparams routine. The "shell" field is a static list of three defaults shown in FIG. 4A separated by a blank space. These defaults can be presented within the network management software as entries in a pull down menu to simplify selection and entry of the default values into a particular database.

With reference to the "hosts" database 40B, the configuration file of FIG. 4 shows that this database has a field delimiter 42B of a tab, and a comment delimiter 44B of a pound sign. The hosts database 40B has three data fields shown as 46B.

Figure 5:
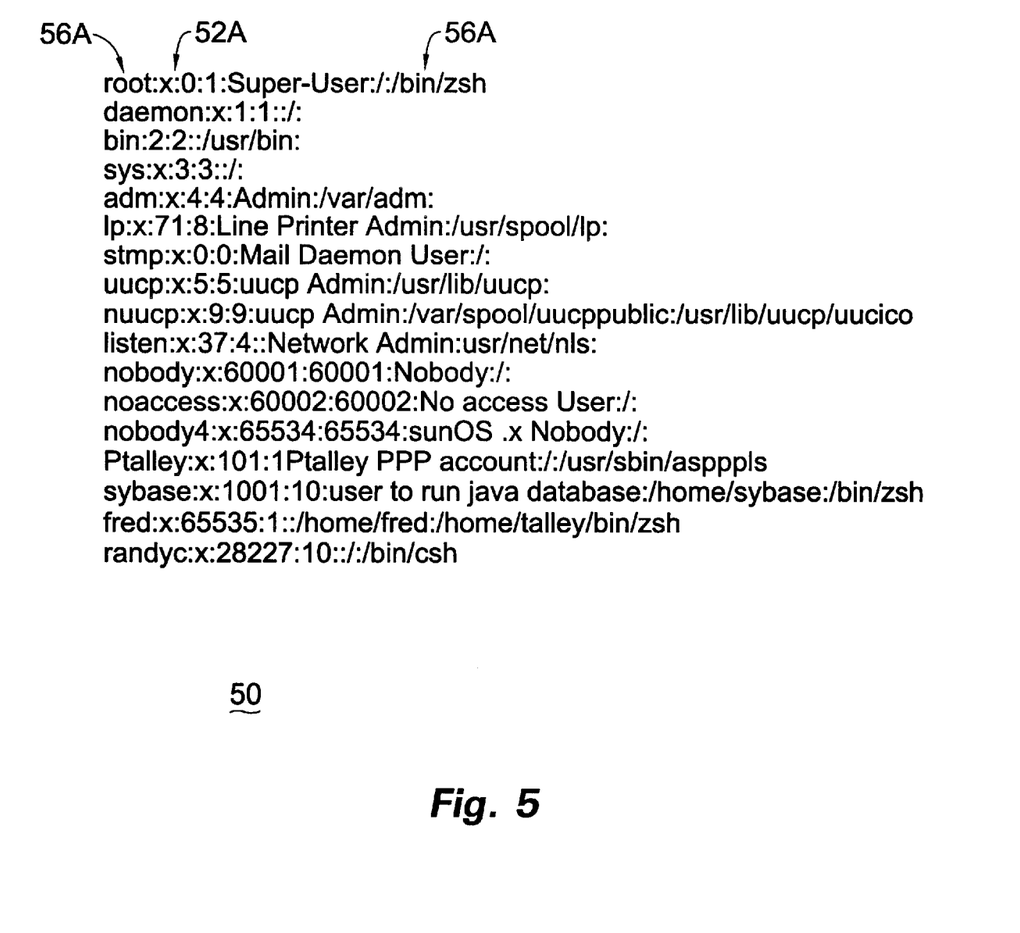
FIG. 5 illustrates an example of a database file in accordance with the present invention.

FIG. 5 illustrates an example of the contents of a database file in accordance with the present invention. As previously mentioned, the database file is in an ASCII text format which is easily readable by a user without the need for executing an additional program to decode and interpret the contents of the database file. In FIG. 5, the example database file shown corresponds to the "/etc/passwd" database file, whose characteristics were previously described with reference to entries 40A, 42A, 44A, and 46A of the configuration file shown in FIG. 4. The example database shown in FIG. 5 has seventeen entries, each entry having seven data fields 56A separated by the field delimiter 52A which is a colon. Therefore, the configuration information contained and shown in FIG. 4 fully describes the content and format of the database file shown in FIG. 5. Hence, the present invention permits the network management software to access and manipulate the information contained within the database shown in FIG. 5, as an example.

Figure 6:
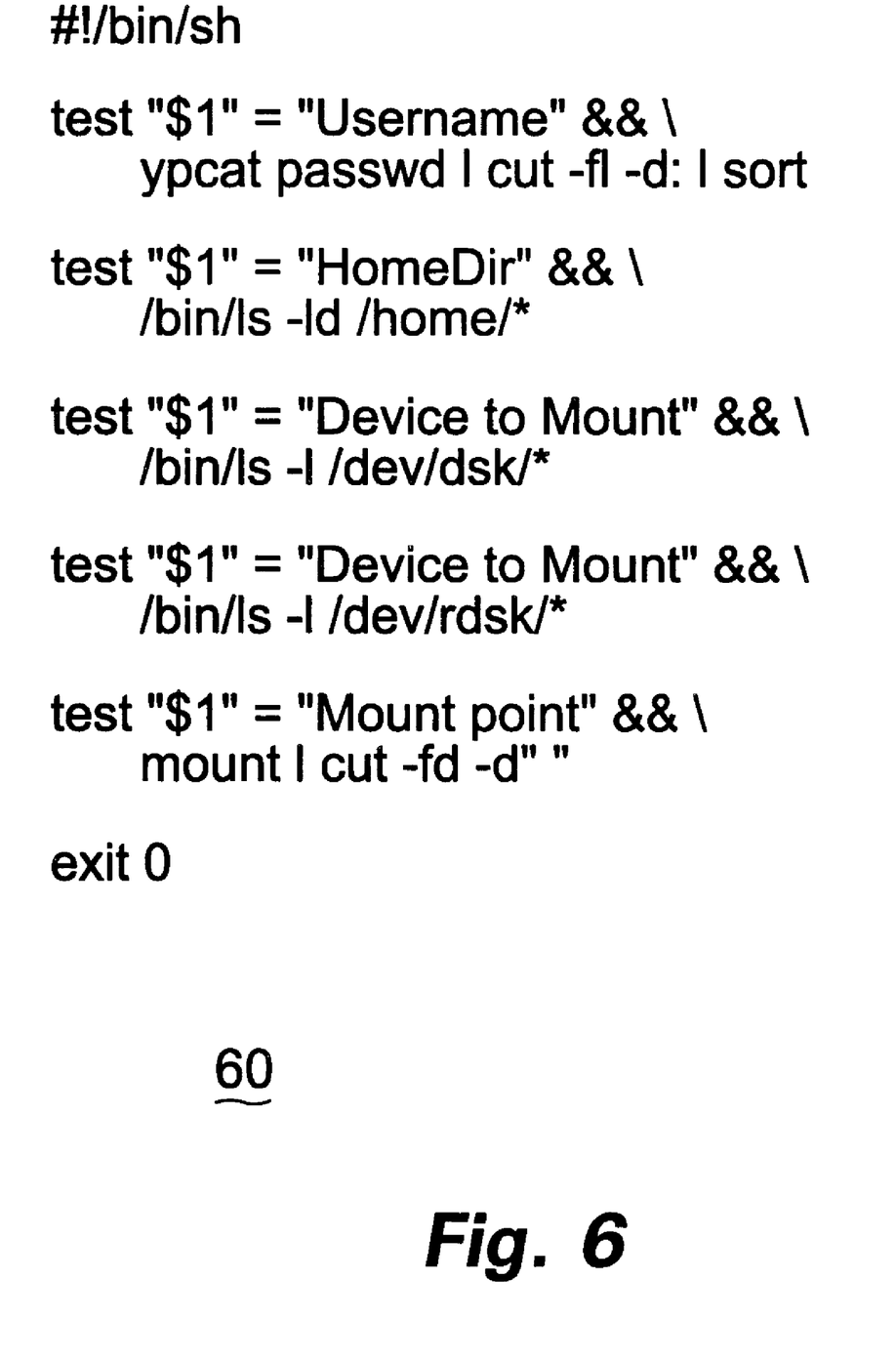
FIG. 6 illustrates an example of an executable file for querying the computer system to obtain a list of default values for the GUI in accordance with the present invention.

FIG. 6 illustrates an example of a program which could dynamically obtain a list of default values to be provided by the network management software for user selection. This program was referred to in FIG. 4 as the "getparams" program for obtaining a dynamic list of user names, home directories, or other current information. While the commands shown in FIG. 6 are UNIX based commands, it is understood that the dynamic lists could be similarly provided within any computing language or operating system.

Figure 7:
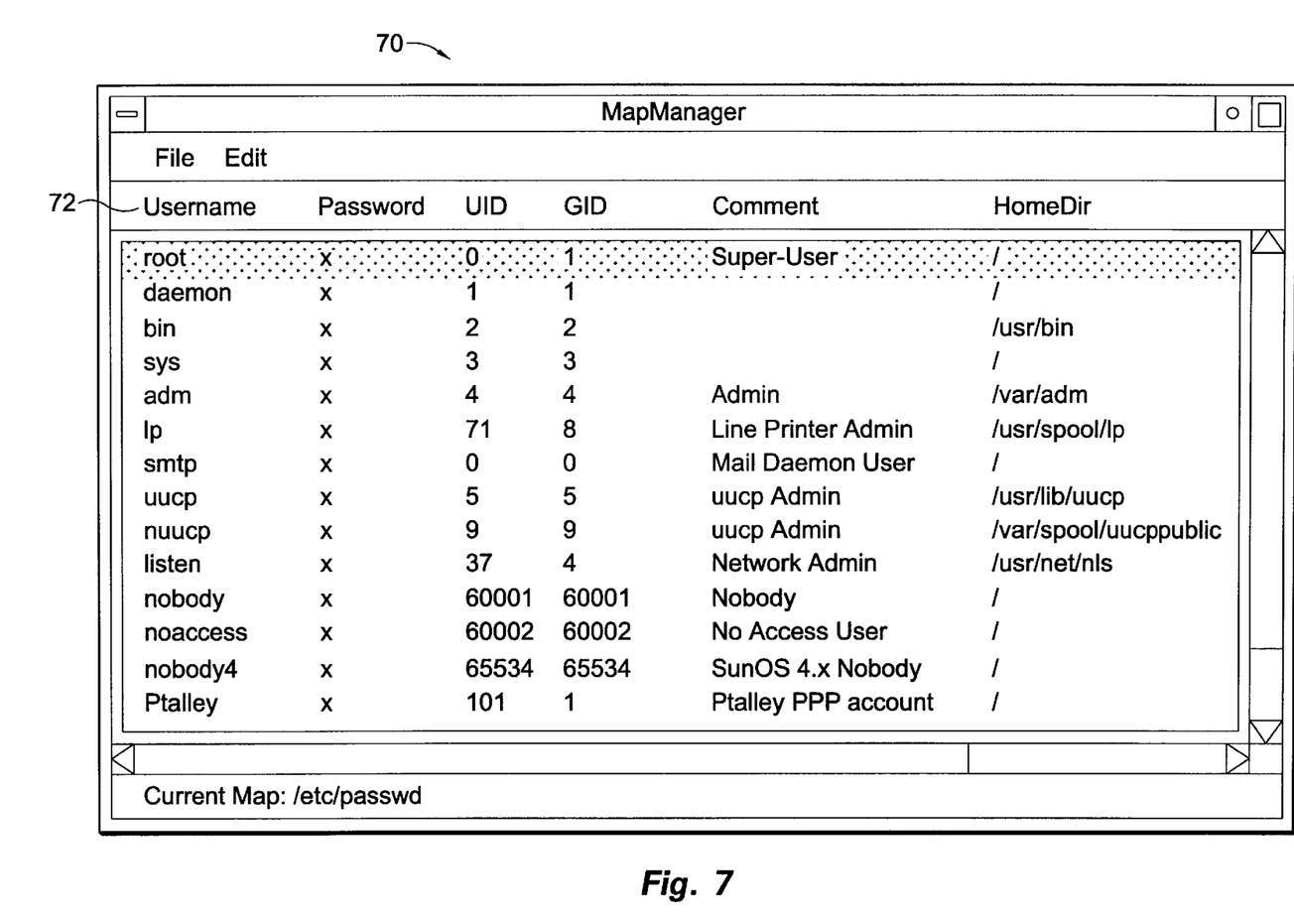
FIG. 7 illustrates an example of a screen display of the graphical user interface generated by the present invention showing the various fields and contents thereof of the sample database shown in FIG. 6 in accordance with the present invention.

FIG. 7 illustrates an example of a screen display of a graphical user interface generated by one embodiment to the present invention. The screen display 70 is shown as a window having labeled columns 72 corresponding to each data field contained within the database. In the particular example shown in FIG. 7, the database shown is the "/etc/passwd" database previously referenced in FIGS. 4 and 5. The content of each entry within the database is shown under its appropriate field heading 72. The user can scroll through each entry within the database and manipulate the database in accordance with the present invention.

Specifically, the present invention can support various functions which manipulate the contents of a particular database. An entry can be added, modified, or deleted from a database, and the resulting database file can be stored. A database file can also be opened, and read. As previously indicated, a GUI can be provided to simplify the user's interface to the database.

Figure 8A:
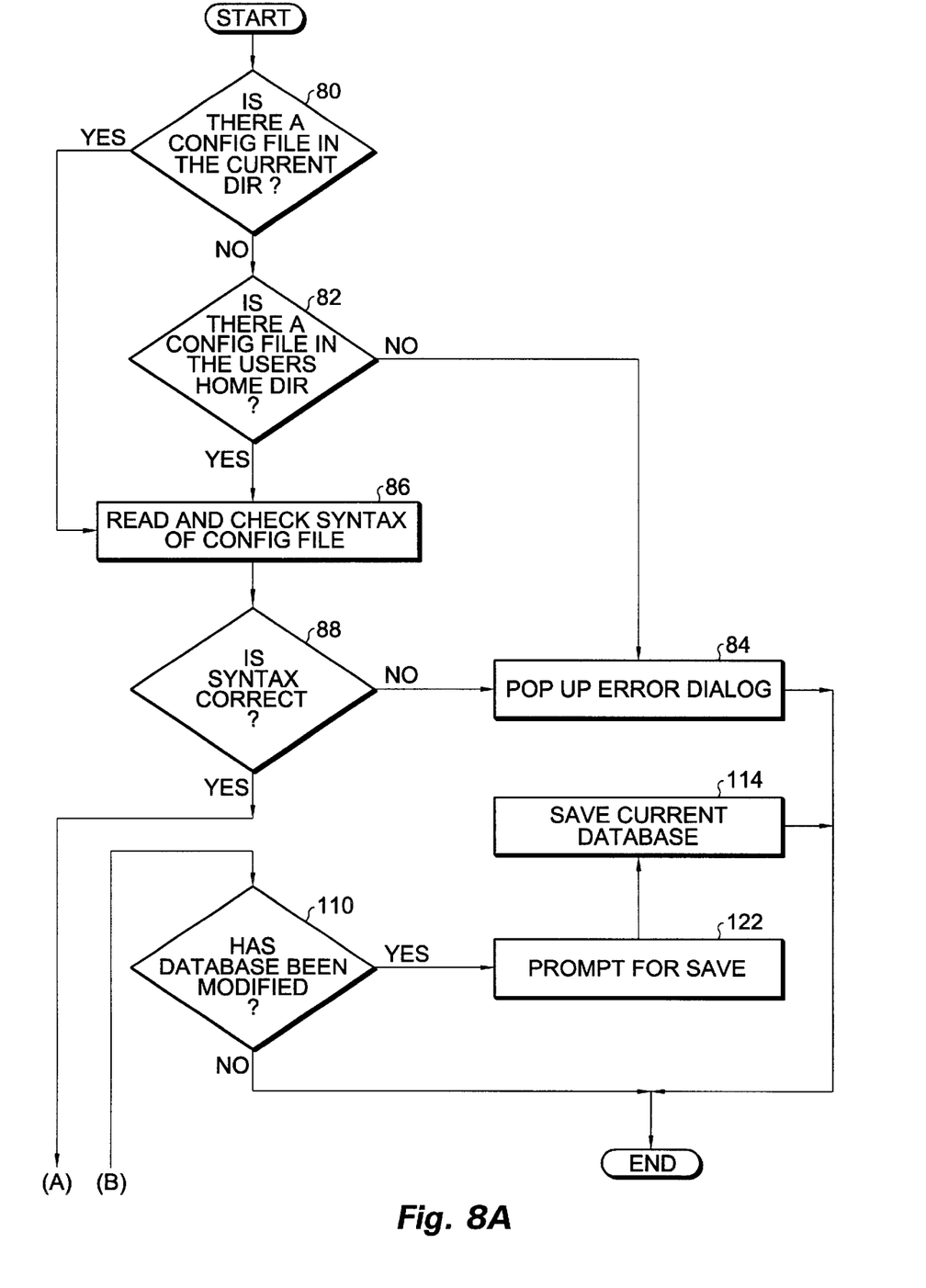
FIG. 8 illustrates an embodiment of the logical operations of the present invention.
Figure 8B:
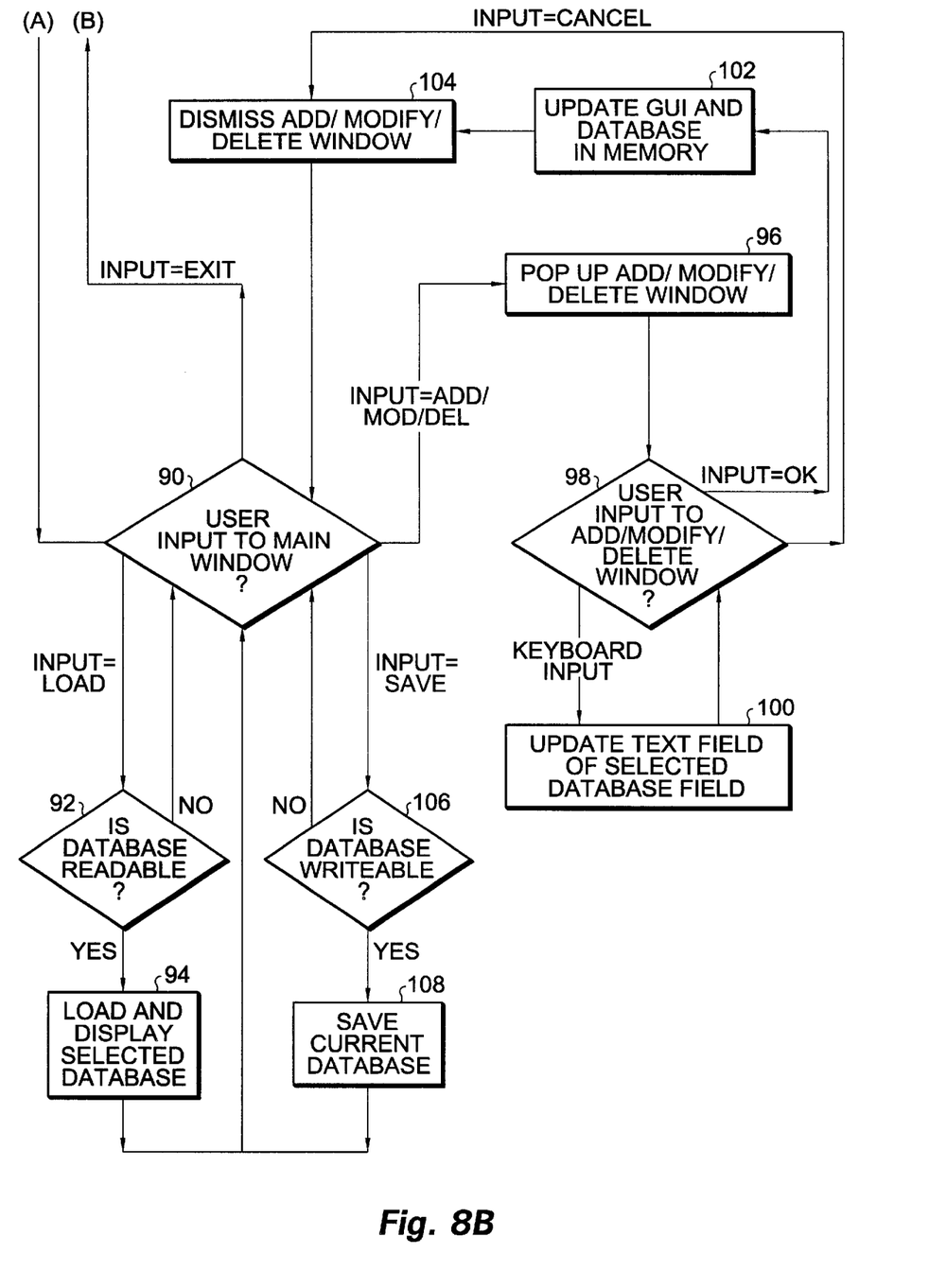

FIG. 8 illustrates an embodiment of the logical operations of the present invention. Operations 80 and 82 determine if there is a configuration file for accessing particular databases within the computing system. Specifically, operation 80 determines if there is a configuration file in the current directory, and if not, operation 82 determines if a configuration file exists in the user's home directory. If there is no configuration file in either of these locations, operation 84 indicates an error to the user of locating the configuration file. Depending upon the particular implementation chosen, searching operations 80 and 82 can be directed towards any number of locations where a configuration file would be expected to reside.

If a configuration file is located, operations 86 and 88 read and check the syntax of the configuration file for correctness. These operations would check for the proper formatting of the elements of the configuration file in accordance with the rules established for the configuration file. If the syntax of the configuration file is incorrect, then operation 84 indicates to the user a configuration file syntax error. If the syntax of the configuration file is correct, then control is passed to operation 90.

Input operation 90 awaits user input into the GUI window for manipulation of a database file. If the user requests that a particular database file be loaded, operation 92 determines if the requested database is a readable file. If the database is not a readable file, then control is returned to input operation 90. This would occur, for example, if the user requested to load a protected or unreadable file such as the user passwords database file, for example. If, however, the database file is readable, then operation 94 loads and displays the selected database file in the GUI window, and control is returned to operation 90.

If the user input detected at operation 90 requests that a database file be edited (i.e., an entry added, modified, or deleted), then operation 96 displays a window to add, modify, or delete an entry of the present database. Operation 98 then detects the user input into the window. If the user input is textural input through the keyboard, then operation 100 updates the appropriate text field of the selected database data field with the changes entered by the user. Control is then returned to operation 98. If the user presses an "okay" button, then operation 102 updates the GUI and the database values in memory. Control is then passed to operation 104.

If the user input detected at operation 98 is selection of a cancel button, then operation 104 closes the window previously displayed at operation 96. Control is then returned to input operation 90.

Operation 100 updates the text fields in a manner which corresponds with the user input detected by operation 98.

For instance, a particular entry can be modified, deleted, or a new entry can be added within the database.

If the user selects to save the existing database file at operation 90, then control is passed to operation 106. Operation 106 determines if the present database is a writable database. If the database is not writable (or if the present user does not have the write privilege to the database file), then operation 106 returns control to input operation 90. Otherwise, operation 108 saves the current database and control is passed to operation 90 for further user input.

If the user at operation 90 requests exiting the program, then operation 110 determines if the database has been modified. If the database has been modified, then operation 112 prompts the user to save the database. If the user selects yes, then operation 114 saves the current database, otherwise the program terminates.

While the method disclosed herein has been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

It will therefore be appreciated that a person can use the present invention to access and manipulate various different databases. For each database which will be accessed, an entry in the configuration file is created which describes the format and content of the particular database. The network management software then uses the configuration file to process, interpret, and modify the contents of the database.

While the invention has been particularly shown and described with reference to a preferred embodiment thereof, it will be understood by those skilled in the art that various other changes in the form and details may be made without departing from the spirit and scope of the invention.

What is claimed is:

1. A method for managing a plurality of computer databases, said method comprising the computer implemented steps of:

providing a database configuration file containing information regarding each of said plurality of computer databases;

providing an interface to said plurality of computer databases for permitting manipulation of the plurality of computer databases by a user, said interface accessing said database configuration file, wherein said interface is adapted to interact both with predefined hard-coded system databases and user-defined system databases; and manipulating one of said plurality of computer databases in accordance with a command from the user.

2. The method of claim 1, wherein said step of providing a database configuration file further comprises:

providing a file name of each of said plurality of computer databases in said configuration file;

providing a field delimiter for each of said plurality of computer databases in said configuration file, each field delimiter specifying a character which separates fields in a computer database specified by said file name; and providing a data field descriptor for each data field of each of said plurality of computer databases.

3. The method of claim 2, wherein said step of providing a database configuration file further comprises:

providing a comment delimiter for each of said plurality of computer databases, each comment delimiter specifying a comment character used within a computer database specified by said file name.

4. The method of claim 1, wherein said step of providing an interface provides a graphical user interface for permitting manipulation of the plurality of computer databases by the user.

5. The method of claim 1, wherein said step of manipulating one of said plurality of computer databases further comprises:

reading and modifying an entry in one of said plurality of computer databases in accordance with the command from the user.

6. The method of claim 1, wherein said plurality of computer databases comprises user-definable databases having different formats.

7. The method of claim 1, wherein said plurality of computer databases comprises user-definable databases and system databases, each database having different formats.

8. The method of claim 1, wherein said plurality of computer databases comprises ASCII text readable files.

9. A computer program product, comprising:

a computer usable code storage medium;

computer readable code embodied in said storage medium for managing a plurality of computer databases, the computer readable code comprising:

computer readable code devices to cause a computer to effect a database configuration file containing information regarding each of said plurality of computer databases;

computer readable code devices to cause a computer to effect an interface to said plurality of computer databases for permitting manipulation of the plurality of computer databases by a user, said interface accessing said database configuration file, wherein said interface is adapted to interact both with predefined hard-coded system databases and user-defined system databases; and computer readable code devices to cause a computer to effect manipulating one of said plurality of computer databases in accordance with a command from the user.

10. The computer program product of claim 9, wherein said computer readable program code devices configured to cause a computer to effect a database configuration file further comprises:

computer readable code devices to cause a computer to effect providing a file name of each of said plurality of computer databases in said configuration file;

computer readable code devices to cause a computer to effect providing a field delimiter for each of said plurality of computer databases in said configuration file, each field delimiter specifying a character which separates fields in a computer database specified by said file name; and computer readable code devices to cause a computer to effect providing a data field descriptor for each data field of each of said plurality of computer databases.

11. The computer program product of claim 10, wherein said computer readable program code devices configured to cause a computer to effect a database configuration file further comprises:

computer readable code devices to cause a computer to effect providing a comment delimiter for each of said plurality of computer databases, each comment delim iter specifying a comment character used within a computer database specified by said file name.

12. The computer program product of claim 9, wherein said computer readable program code devices configured to cause a computer to effect an interface further comprises:

computer readable code devices to cause a computer to effect providing a graphical user interface for permitting manipulation of the plurality of computer databases by the user.

13. The computer program product of claim 9, wherein said computer readable program code devices configured to cause a computer to effect a manipulating one of said plurality of computer databases further comprises:

computer readable code devices to cause a computer to effect reading and modifying an entry in one of said plurality of computer databases in accordance with the command from the user.

14. The computer program product of claim 9, wherein said plurality of computer databases comprises user-definable databases having different computer readable formats.

15. The computer program product of claim 9, wherein said plurality of computer databases comprises user-definable databases and system databases, each database having different formats.

16. The computer program product of claim 9 wherein said plurality of computer databases comprises ASCII text readable files.

* * * * *